United States Patent [19]
Ulbrich et al.

[11] Patent Number: 5,863,437
[45] Date of Patent: *Jan. 26, 1999

[54] METHOD AND DEVICE FOR THE SEPARATION OF A MIXTURE

[75] Inventors: Bernhard Ulbrich, Elsdorf; Heinz Jendrny, Dormagen, both of Germany

[73] Assignee: Rhone-Poulenc Rorer GmbH, Cologne, Germany

[*] Notice: This patent issued on a continued prosecution application filed under 37 CFR 1.53(d), and is subject to the twenty year patent term provisions of 35 U.S.C. 154(a)(2).

[21] Appl. No.: 557,023

[22] PCT Filed: Oct. 27, 1994

[86] PCT No.: PCT/DE94/01270

§ 371 Date: Apr. 17, 1996

§ 102(e) Date: Apr. 17, 1996

[87] PCT Pub. No.: WO95/12445

PCT Pub. Date: May 11, 1995

[30] Foreign Application Priority Data

Nov. 2, 1993 [DE] Germany ............ 43 37 289.9

[51] Int. Cl.⁶ .................................................. B01D 15/08
[52] U.S. Cl. .................... 210/656; 210/658; 549/510
[58] Field of Search ................ 210/635, 656, 210/658, 659, 660, 676, 777, 778, 198.2, 264, 400, 401; 549/510

[56] References Cited

U.S. PATENT DOCUMENTS

| | | | |
|---|---|---|---|
| 2,678,132 | 3/1954 | Beard | 210/658 |
| 2,738,880 | 3/1956 | Whitney | 210/400 |
| 4,083,778 | 4/1978 | McGrew | 210/DIG. 5 |
| 4,242,107 | 12/1980 | Jenkins | 55/67 |
| 4,292,173 | 9/1981 | Parmentier | 210/138 |
| 4,650,575 | 3/1987 | White | 210/183 |
| 4,740,310 | 4/1988 | Dickey | 210/656 |
| 4,758,349 | 7/1988 | Ma | 210/264 |
| 4,761,236 | 8/1988 | Dickey | 210/635 |
| 4,769,158 | 9/1988 | Eckert | 210/400 |
| 4,824,792 | 4/1989 | Thorpe | 422/70 |
| 4,908,136 | 3/1990 | Chou | 210/400 |
| 5,256,298 | 10/1993 | Powell | 210/660 |
| 5,393,895 | 2/1995 | Gaullier | 549/510 |
| 5,407,580 | 4/1995 | Hester | 210/635 |
| 5,538,637 | 7/1996 | Hester | 210/635 |
| 5,547,580 | 8/1996 | Tsujii | 210/198.2 |

FOREIGN PATENT DOCUMENTS

| | | | |
|---|---|---|---|
| 0 495 640 A1 | 7/1992 | European Pat. Off. | 210/198.2 |
| WO 92/07842 | 5/1992 | WIPO | 210/198.2 |

*Primary Examiner*—Ernest G. Therkorn
*Attorney, Agent, or Firm*—Proskauer Rose LLP

[57] ABSTRACT

The invention pertains to a method and device for separating a mixture having at least two components, wherein a separation phase is impacted by the mixture to be separated and then the separation phase loaded with the mixture is eluted with at least one fluid. The separation phase is transported from a first station, at which it is introduced with the mixture for separation, to at least a second station, at which the separation phase is eluted with the at least one fluid.

24 Claims, 1 Drawing Sheet

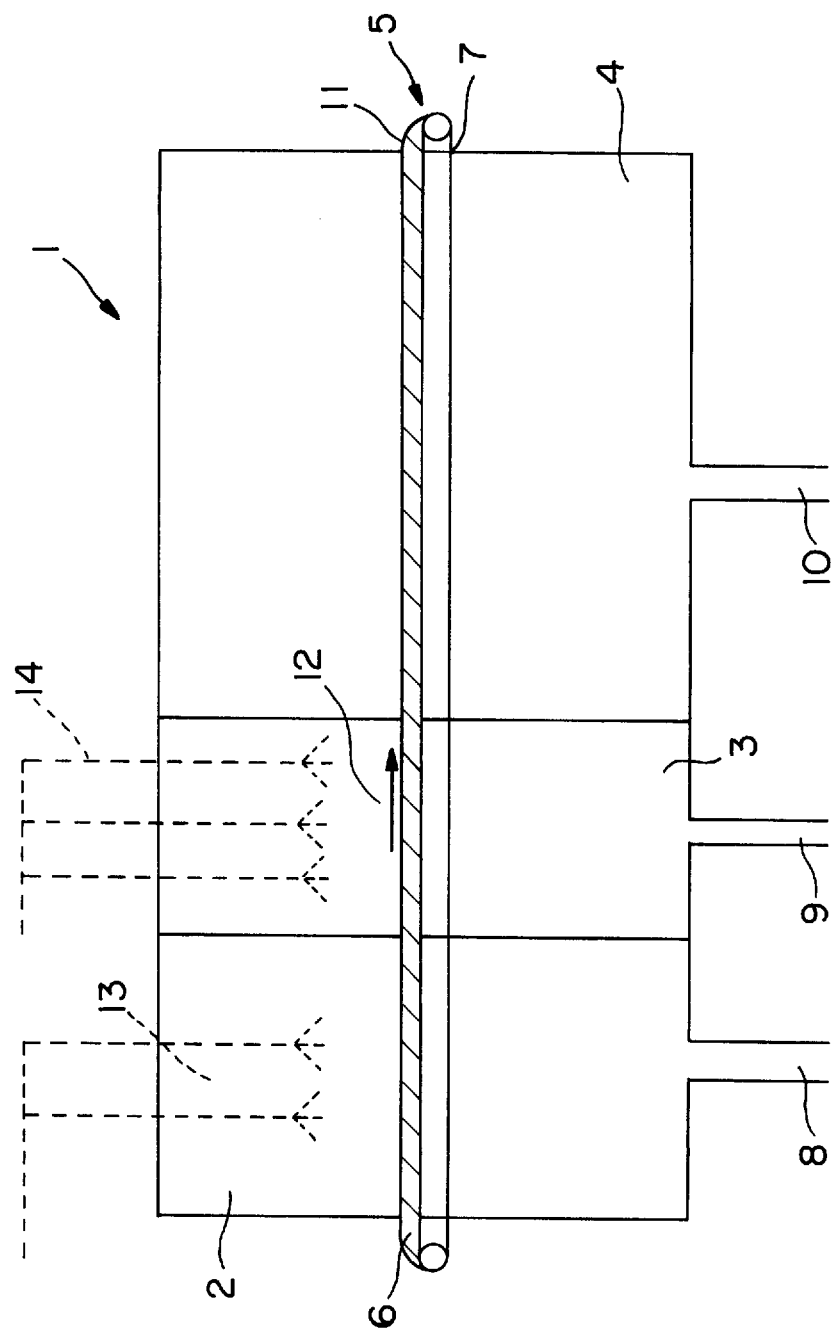

METHOD AND DEVICE FOR THE SEPARATION OF A MIXTURE

The present invention is directed to a method for the separation of a mixture containing at least two components and being characterized by the generic part of patent claim 1, as well as a device for the realization of the method.

In order to separate mixtures containing at least two components, it is known that the mixture to be separated is added to a separation phase usually also named stationary phase and that thereafter the phase charged with the mixture is eluted with at least one fluid. If the components to be separated are such components that can be converted into the gas phase without being decomposed, then the above described known separation takes place in a gas-chromatographical way which means that both the mixture to be separated as well as the fluid used for the elution are gases. According to the column-chromatographical separation which is particularly suitable for the separation of such mixtures with components that cannot be converted into the gas phase without being decomposed or chemically modified, the separation phase (stationary phase) arranged in a column is eluted with a liquid or a liquid mixture after the mixture was added. This method can not only be applied to the separation of mixtures for analytical purposes, but also in a industrial scale for the preparative isolation of correspondingly separated components. Furthermore the column-chromatographical method can be applied to the purification of substances.

The disadvantage of the above described preparative column-chromatographical procedure is that it makes it impossible to obtain continuously a separation and isolation of special components out of the mixture. The column-chromatographical preparative procedure rather allows only a discontinuous, batchwise operation, which means that firstly the separation phase charged with the mixture to be separated has to be eluted completely with the fluid and if necessary regenerated, in order to charge it thereafter again with the mixture to be separated. Such a batchwise procedure however is relatively expensive.

The aim of the present invention is to provide a method of the above mentioned kind that allows a continuous separation of a mixture containing at least two components.

This aim is realized according to the invention by a method with the characteristics of patent claim 1.

According to the inventive method for the separation of a mixture containing at least two components, the mixture to be separated is added to a separation phase and thereafter the separation phase charged with the mixture to be separated is eluted with at least one fluid, as it is described initially in the prior art. The inventive method differs from the known method in which the separation phase is arranged stationarily in a column, in the way that according to the inventive method the separation phase is transported from a first station (chamber) where the separation phase is charged with the mixture to be separated, to at least one second station (chamber) where the separation phase is eluted with at least one fluid. In other words, according to the inventive method first of all the mixture to be separated is added to the separation phase and thereafter the separation phase is located separately from the station where the mixture to be separated is added, and is transported to at least one station where then the correspondingly charged separation phase is eluted with at least one fluid.

The inventive method shows a number of advantages. First of all one essential advantage is that the inventive method allows a continuous procedure for the separation of the mixture, preferably also for the separation of a multicomponent-mixture. The inventive method is particularly advantageous when it is used for the isolation of larger amounts of single components found in the mixture to be separated. This does not only lead to an essential increase of the mass expulsion of the single components found in the mixture, but it causes at the same time a clear increase of production, whereby it is not necessary to install expensive devices. This explains that the inventive method lowers drastically the costs for the isolation of the single components out of the mixture. It is also possible to carry out the inventive method in a full automatically way, since herefore it is only necessary to adapt the transport speed of the separation phase to the charging speed and to the elution speed. Furthermore it is easily possible to prevent unwanted side reactions as for example an oxidation of the single components of the mixture, since herefore it is only necessary to carry out the charging of the separation phase, its transport from the first to the second station, respectively the following stations, and/or the elution of the separation phase in the second station, respectively the further stations, in a corresponding atmosphere, preferably in a inert gas atmosphere or under a vacuum. This leads to the fact, that single components of the mixture isolated according to the inventive method, are preferably free of unwanted by-products which, are generated by a chemical reaction of the single components with the ambient atmosphere, so that, according to the inventive method, highly pure single components with a high mass expulsion can be isolated. Furthermore the inventive method allows to set in each station a temperature being most favourable for the separation, and allows as well as a composition of the elution fluid used in this station, whereby this composition being most favourable for the separation is adapted to the single component, respectively the single components of the mixture to be separated in this station. This however is not possible in the known column-chromatographical method.

In a first embodiment of the inventive method the separation phase is continuously charged with the mixture, whereby the charged separation phase is then also continuously eluted with the fluid. Such an embodiment of the inventive method shows the advantage of a high product flow rate and a high separation capacity.

In the inventive method basically each separation phase can be used that is suitable to be charged with the mixture to be separated and correspondingly to be transported from the first station (charging station) to the second station (elution station). Concerning liquid or gaseous separation phases such transport can be obtained preferably easy for example by correspondingly pumping the liquid or gaseous separation phase. However, it is preferably suitable if in the inventive method a solid separation phase is used which is optionally modified in its separation efficiency by adding a liquid or a mixture of a liquid, because such a solid separation phase can be arranged easily and without a big effort in an predetermined layer thickness and it can be transported from the first station to the second station.

A preferably suitable development of the above described embodiment of the inventive method using a solid separation phase is characterized in that the solid separation phase is transported from the first station (charging station) to the second station (elution station) by a conveyor belt, preferably an endless conveyor belt.

The selection of the conveyor belt depends on the correspondingly used solid separation phase which means in particular the chemical composition and the particle size of the separation phase. Herefore for example such conveyor belts are used that are made of a fabric of metal fibres, polyalkylene fibres, polyester fibres, polyamide fibres and aromatic polyamide fibres, whereby the mesh-values of such conveyor belts vary preferably between 20 mesh and 270 mesh, especially between 60 and 200 mesh. Such conveyor belts guarantee that on one hand no unwanted modifications of the separated single components occur caused by a chemical modification of the material of the conveyor belt, and that on the other hand the fluid used for the elution perfuses the conveyor belt appropriately.

The thickness of the solid separation phase to be applied on the conveyor belt according to the inventive method, in general depends on the selection of the separation phase correspondingly used, on the permeability of the separation phase for the fluid correspondingly used during the elution and on the quantity of components of the mixture to be separated.

If well permeable separation phases and a large number of mixture components to be separated are used, thick layers are preferably arranged. Rather thin layers of the separation phase are arranged on the conveyor belt if such separation phases are used that have a relatively bad permeability for the fluid used for the elution and if mixtures are meant to be separated containing a few components. The layer thickness of the separation phase arranged on the conveyor belt usually varies between 0,1 cm and 30 cm, preferably between 2 cm and 15 cm.

According to the inventive method, the mixture to be separated is dissolved, dispersed and/or emulsified with a suitable liquid, preferably with an organic solvent, in order to bring the mixture to be separated into contact with the separation phase. Thereafter the solution, dispersion and/or emulsion is applied onto the separation phase.

If in the inventive method the solid separation phase is transported by a conveyor belt from the first station to the second station, as it is described above in an embodiment of the inventive method, it is advisable to spray the solution, dispersion and/or emulsion onto the separation phase. Hereby the solution, dispersion and/or emulsion of the mixture to be separated is applied, preferably sprayed onto the separation phase being then planar according to this embodiment of the inventive method, in such a quantity that the solution, dispersion and/or emulsion only perfuses the exterior and upper region of the separation phase relatively to the thickness of the separation phase. That way the mixture to be separated preferably covers only about 5% to 25% of the separation phase, relatively to the thickness of its layer. Such a relatively low diffusion of the mixture to be separated into the separation phase guarantees that the mixture to be separated is perfectly separated by the fluid, preferably by the organic solvent in the later elution, so that correspondingly particularly pure fractions of the single components can be isolated. In the first station the mixture to be separated can obviously be applied on the separation phase in such a quantity that the separation phase is completely perfused with the solution, dispersion and/or emulsion, relatively to its thickness.

Another embodiment of the inventive method concerns the drying of the separation phase between the first station in which the separation phase is charged with the mixture to be separated and the second station in which the separation phase charged with the mixture is eluted with the fluid, preferably with the organic solvent. In other words, during the transport of the separation phase from the first station to the second station the fluid, preferably the organic solvent used for the application of the mixture to be separated is removed by the continuous drying of the separation phase.

That way a dried separation phase is correspondingly eluted with the fluid, preferably with the organic solvent or solvent mixture in the second station. Such an example of the inventive method improves the separation capacity and leads thereby to a generation of particularly pure fractions of the single components of the mixture. Furthermore this embodiment of the inventive method is used whenever the fluid used for the manufacturing of the solution, dispersion and/or emulsion of the mixture to be separated is not miscible or compatible with the fluid used for the following elution in the second station.

If, according to the inventive method, such mixtures that contain more than two components or more than two fractions are meant to be separated, it is possible to arrange a plurality of further stations in connection to the second station, whereby the separation phase charged with the mixture to be separated is transported into the further stations and eluted in each of these stations. The number of these further stations depends on the number of the components to be separated, respectively the fractions to be separated. If for example a mixture containing five components, respectively five fractions, is separated according to the inventive method, also five stations for the elution of the separation phase are correspondingly required, meaning also four further stations next to the second station. This means in general that the number of the stations for the elution, that is to say the number of the second stations as well as the further stations, do correspond to the number of the single components to be separated and/or the number of fractions of the mixture to be separated, as far as all the components are meant to be separated, respectively all fractions are meant to be separated during the inventive separation.

As already explained above in the inventive method an inert gas can flow round the separation phase during the transport of the separation phase, so that correspondingly a preferably gentle separation and isolation into the single components takes place. Furthermore the inert gas flowing round the separation phase prevents then a generation of explosive gas mixtures when such liquids are applied and/or eluted that easily evaporate creating thereby correspondingly explosive and/or toxic mixtures of air-fluid-vapour with the available air. According to the inventive method preferably nitrogene, carbon dioxide and/or noble gas as well as mixtures of the above mentioned gases are used as inert gas.

Depending on the correspondingly selected material of the separation phase and on the mixture to be separated the separation phase can be wasted after the elution and the drying. But it is more suitable to regenerate and, if necessary, to dry the separation phase after the elution and to use it thereafter again in the circuit. This embodiment of the inventive method has the advantage of being highly economical and furthermore non-polluting.

For the inventive method basically each material being used also in the conventional preparative column-chromatography can be used as separation phase. Preferably silica gel, infusorial earth and/or aluminium oxide is used for the inventive method, whereby the particle size of the above mentioned special separation phases varies between 30 $\mu$m and 500 $\mu$m depending on the corresponding separation problem.

In order to accelerate the separation of the mixture according to the inventive method, it is basically possible that the fluid correspondingly used for the application of the mixture to be separated and/or for the elution is applied under pressure. However, it is preferably suitable if the charging of the separation phase with the mixture to be separated and/or the elution of the separation phase charged with the mixture to be separated are carried out under vacuum, especially since hereby it is possible to prevent effectively the generation of explosive mixtures of air-fluid-vapour, if necessary also without adding an inert gas.

Surprisingly it was observed that the inventive method is preferably suitable if the mixture to be separated is an extract of a natural product. With the inventive method single components or predetermined fractions can be isolated from such an extract of a natural product in a relatively quick, economical and highly pure manner.

According to the inventive method preferably a plant extract is used as mixture to be separated, whereby however also such an extract can be used that was obtained by the extraction of animal components as for example eggs and such.

A preferably suitable embodiment of the inventive method describes that an extract obtained by the extraction of yew plant components, preferably obtained by the extraction of the yew needles or the yew bark, can be used as mixture to be separated. Hereby it was observed that during the application of the inventive method particularly a desired single component, preferably the 10-deacetylbaccatin III (10-DAB) can be isolated from such a multi-component mixture in a particularly economical and gentle manner, whereby the single component has a high purity, particularly a purity of more than 80% by weight, and preferably between 92% by weight and 98% by weight. This is not possible according to the known column-chromatographical method.

According to the above described embodiment of the inventive method particularly the above mentioned extract being the mixture to be separated is applied, preferably sprayed onto the separation phase together with a solvent, preferably butyl acetate, whereby the extract is obtained from yew plant components and preferably from the yew needles. Hereby it is preferred that the used extract comprising butyl acetate contains the 10-deacetylbaccatin III (10-DAB) in a concentration of between 3% by weight and 20% by weight, so that then a highly pure 10-deacetylbaccatin III (10-DAB) having less than 20% by weight, preferably less than 8% to 2% by weight contaminations, emerges after the separation according to the inventive method.

In order to make possible by the inventive method the above described isolation of the highly pure 10-deacetylbaccatin III (10-DAB) preferably a silica gel is used as separation phase and an alcohol and/or alcohol mixture, preferably a $C_1$–$C_4$-alcohol and/or a $C_1$–$C_4$-alcohol mixture is used as elution fluid.

The inventive method is further preferably suitable if the mixture to be separated is crude lecithin, preferably the crude lecithin obtained from soybeans. By applying the inventive method special single components or fractions of single components can be isolated out of crude lecithin or pure lecithin as it is described more detailed in special following examples.

By the term crude lecithin, preferably soybean lecithin, a mixture is meant having the following composition:

12–21% by weight phosphatidylcholine,
12–20% by weight phosphatidylethanolamine,
8–14% by weight phosphatidylinositol,
8–14% by weight phosphatidic acid,
2–5% by weight N-acyl-phosphatidylethanolamine,
26–51% by weight oil,
5–10% by weight other phospholipides,
5–10% by weight glycolipides and
2–5% by weight sterols, carbohydrates, water and other contaminations.

Contrarily to the above described crude lecithin, the deoiled crude lecithin used as a mixture in the inventive method and named also pure lecithin or lecithin granulate has a content of phosphatidylcholine varying between 15% by weight and 35% by weight. With the exception of the above mentioned oil concentrations, the remaining components (phosphatidylethanolamine, phosphatidylinositol, phosphatidic acid, N-acyl-phosphatidylethanolamine, other phospholipides) exist in the mass ratios indicated above for the crude lecithin. According to the inventive method and depending on the correspondingly applied process parameter, preferably on the correspondingly used separation phase, on the temperature, on the transport speed of the separation phase, on the solvent used for the elution and/or on the layer thickness of the separation phase, not only single products as for example phospholipides with a concentration of at least 90% by weight of phosphatidylcholine can be isolated out of this lecithin (crude or pure lecithin), but also special fractions with a defined composition can be isolated. These fractions preferably contain either 77–87% by weight phosphatidylcholine,
0–4% by weight phosphatidylethanolamine,
0–4% by weight phosphatidylinositol,
0–1% by weight phosphatidic acid,
1–5% by weight oil and
0–22% by weight other accompanying substances;

or

65–85% by weight phosphatidylcholine,
0–8% by weight phosphatidylethanolamine,
0–4% by weight phosphatidylinositol,
0–10% by weight phosphatidic acid,
0–10% by weight oil and
0–35% by weight other accompanying substances;

or

73–93% by weight phosphatidylcholine,
0–6% by weight phosphatidylethanolamine,
0–4% by weight phosphatidylinositol,
0–10% by weight phosphatidic acid,
0–5% by weight oil and
0–27% by weight other accompanying substances.

As already noted above preferably an alcohol and/or an alcohol mixture, preferably a $C_1$–$C_4$-alcohol and/or a $C_1$–$C_4$-alcohol mixture is used as elution fluid in the inventive method.

Concerning the temperature to be applied according to the inventive method it is noted that the inventive method makes possible that particularly any temperature can be set in each station, whereby the set temperature then can be adapted to the mixture to be correspondingly separated and to the solvent used for the elution. The temperature during the elution usually varies between 10° C. and 60° C., preferably between 20° C. and 35° C.

Furthermore the present invention concerns a device carrying out the above described inventive methods.

The inventive device carrying out the above described inventive methods has a first chamber (1. station) for the application of the mixture to be separated on the separation phase as well as at least one second chamber (2. station) for the elution of the separation phase charged with the mixture, whereby the first and the second chamber are provided with a conveyor device for the transport of the separation phase from the first chamber to the second chamber.

The inventive device has a number of advantages. First of all it is to be noted that the inventive device is constructed in a relatively simple and compact manner. For that reason the inventive device can be constructed on relatively low expenses. Furthermore the at least two chambers of the inventive device in which the separation phase is charged with the mixture to be separated (first chamber), respectively in which the charged separation phase is eluted with the fluid (second chamber), are preferably constructed as a closed system, so that in the inventive device all fluids can be used as for example toxic fluids and fluids that together with air formulate explosive air-fluid-vapours. For that reason the inventive device can be used without additional safety precautions.

According to a first embodiment of the inventive device the conveyor device is a conveyor belt, preferably an endless conveyor belt. In the first chamber the separation phase is preferably and continuously charged with the mixture to be separated, preferably with a solution, dispersion and/or emulsion and then continuously transported into the second chamber in which the separation phase is preferably and also continuously eluted with the used fluid. In order to guarantee the above described charging of the separation phase in the first chamber, whereby the separation phase is continuously transported through the chambers, respectively in order to guarantee the elution in the second chamber, a particularly suitable embodiment of the inventive device has an application device for a corresponding liquid phase (solution, dispersion and/or emulsion of the mixture to be separated in the first chamber, respectively an elution fluid in the second chamber), whereby this application device is stationarily located above the separation phase.

This application device can basically be formed in any way, whereby particularly reproducible results of the application of the mixture to be separated on the separation phase, respectively of the elution of the separation phase charged with the mixture can be achieved if the application device is an application nozzle extending across the whole breadth of the conveyor device of the separation phase.

A further embodiment of the inventive device preferably serving for the separation of such mixture out of which more components and/or fractions are meant to be isolated, has one to eight further chambers arranged behind the second chamber in the sense of direction the separation phase is transported. Hereby the separation phase charged with the mixture to be separated is eluted, preferably continuously eluted with a first fluid in the first chamber, so that then a further elution of the separation phase can take place during the transport of the separation phase into the first further chamber in order to isolate a second component or a second fraction. Similar processes then take place in the second to the eighth chamber.

In order to guarantee the disposal without any problems and/or regeneration of the separation phase according to the inventive method, a further development of the inventive device proposes that hereby one of the further chambers is formed as a drying chamber, whereby this drying chamber is located preferably at the end of the device in the sense of the transport direction of the separation phase. In this drying chamber that can be heated up to a temperature particularly of between 50° C. and 180° C., preferably between 80° C. and 130° C., additional suction devices accelerating the removal of the fluids are arranged, whereby these suction devices can cause a vacuum in the drying chamber.

A further embodiment of the inventive device that serves preferably for the separation of such mixtures and out of which more components and/or fractions are meant to be isolated, has eight further chambers arranged behind the second chamber in the sense of direction the separation phase is conveyed. Hereby first of all the separation phase charged with the mixture is eluted with a first fluid in the second chamber, preferably continuously eluted, so that then a further elution of the separation phase during its transport into the first further chamber can take place, in order to isolate a second component or a second fraction. Then similar processes take place in the second to the eighth chamber.

In order to guarantee for the embodiments of the inventive device according to which a solid separation phase is arranged on a conveyor belt, that the separation phase is applied on the conveyor belt with a constant layer thickness and with a constant bulk density, another embodiment of the inventive device provides an application device for the application of the separation phase on the conveyor belt, whereby this application device is located before the first chamber in the sense of direction the separation phase is transported. Thereby the application device is constructed preferably in that way that a dispersion of the separation phase is flushed on the conveyor belt in a continuous quantity per surface unit, so that thereafter the dispergator, preferably being water and/or preferably ethanol, can escape through the conveyor belt, whereby that way a solid separation phase is formulated on the conveyor belt. If, according to this embodiment of the inventive device, the residues of the dispergator, respectively the water or the ethanol remaining in the separation phase are disturbing, then an additional drying chamber can be arranged before the first chamber. It is possible of course to form the application device for example like a slit extending over the whole breadth of the conveyor belt, so that a dry solid separation phase is applied directly on the conveyor belt.

In order to guarantee that, according to the inventive method, the fluid used for the application of the mixture in the first chamber is removed between the first and the second chamber, a further embodiment of the inventive device provides a drying chamber arranged between the first and the second chamber in the sense of direction the separation phase is transported. Hereby this drying chamber can be formed the same way as it is described for the drying chamber used for the separation of the eluted separation phase.

A fluid used for the elution was repeatedly mentioned above in connection with the inventive method as well as with the inventive device. Hereby preferably a liquid, preferably an organic solvent, is meant, whereby then particularly the alcohols, respectively the alcohol mixtures are used as elution fluid according to the above described special applications of the inventive method for the separation of the natural product extracts.

Favourable developments of the inventive method as well as of the inventive device are indicated in the subclaims.

BRIEF DESCRIPTION OF THE DRAWING

The inventive device is explained more detailed below in connection with the drawing showing a schematical view of a first embodiment.

DESCRIPTION OF THE PREFERRED EMBODIMENTS

The inventive device is explained more detailed in the following by five examples.

The embodiment of the device as whole marked with 1 that is shown in the only figure of the drawing has a first chamber 2, a second chamber 3 as well as a further chamber 4, whereby an endless conveyor belt 5 is extended from the entrance 6 of the first chamber 2 to the exit 7 of the further chamber 4. Each chamber 2, 3 and 4 is connected with an outlet 8, 9, respectively 10, whereby the outlets 8–10 lead into corresponding tanks that are not shown.

The endless conveyor belt 5 is charged with a separation phase 11 at the entrance 6 of the first chamber 2 over an application device that is not shown, whereby the application device not shown is constructed that way that the separation phase 11 is applied in its dry form on the conveyor belt 5. Hereby the layer thickness and the bulk density of the separation phase 11 are adjustable.

In the first chamber 2 the solution, dispersion and/or emulsion of the mixture to be separated is sprayed onto the separation phase 11 by corresponding dosing nozzles 13, whereby the separation phase 11 is transported by the conveyor belt 5 in the sense of direction of the arrow 12. The dosing nozzles 13 extend across the whole breadth of the separation phase 11.

Since the first chamber 2 is set under a vacuum by the outlet 8, a part of the fluid used for the manufacturing of the solution, dispersion and/or emulsion of the mixture to be separated evaporates.

After the transport of the separation phase now charged with the mixture into the second chamber 3, a suitable eluent is added to the separation phase. Herefore chamber 3 has three exemplarily shown nozzle devices 14 that extend diagonally to the transport direction the separation phase 11 and that cause an elution of a single component or a fraction of the mixture. Hereby the component found in the eluent, respectively the fraction of the mixture found in the eluent are obtained at the outlet 9, whereby the component, respectively the fraction can be stored temporarily and correspondingly recovered in the tank not shown.

In the further chamber 4 formed as a drying chamber according to the shown embodiment the separation phase 11 is set under a vacuum and heated up which leads to the fact that all the residues of the eluent are removed.

At the outlet 7 a separation phase 11 emerges that is still charged with the components, respectively the fractions according to the shown embodiment and that is not meant to be isolated. For that reason this residually charged separation phase can be either regenerated or wasted. However, if also the isolation of these residual components of the mixture is desired, it is only necessary to provide a corresponding number of chambers being formed like the second chamber 3 and being arranged between the second chamber 3 and the further chambers 4.

EXAMPLE 1

A solution of the mixture A of 50% by weight in ethanol was treated in the above described device. Hereby aluminium oxide was used as separation phase in a layer thickness of 8 cm, whereby the conveyor belt having a breadth of 1 m was transported with a speed of 10 m/h through the chambers 2 to 4.

In the first chamber 2 700 kg of the solution of the mixture A of 50% by weight in ethanol/h were sprayed by nozzles onto the separation phase.

In the second chamber 3 700 kg ethanol/h were sprayed by nozzles onto the separation phase charged with the mixture A.

The eluate hereby emerged and drawn off over the outlet 9 contained a mixture B, whereby the composition of the mixtures A and B is indicated below.

Composition of the mixture A (before the treatment):
77–86% by weight phosphatidylcholine,
0–4% by weight phosphatidylethanolamine,
0–4% by weight phosphatidylinositol,
3–6% by weight phosphatidic acid,
1–5% by weight soy oil and
0–19% by weight other accompanying substances.
Composition of the mixture B (after the treatment):
77–86% by weight phosphatidylcholine,
0–4% by weight phosphatidylethanolamine,
0–4% by weight phosphatidylinositol,
0–1% by weight phosphatidic acid,
1–5% by weight soy oil and
0–22% by weight other accompanying substances.

The comparison of the above indicated compositions of the mixtures A and B shows clearly that the concentration of unwanted phosphatidic acid was drastically reduced during the treatment.

After the elution of the separation phase this separation phase moistened with ethanol was heated up to a temperature of 80° C. in the drying chamber 4 under a vacuum. That led to the fact that the ethanol was completely vaporized and that a dry separation phase emerged which was correspondingly wasted.

EXAMPLE 2

A solution of the mixture C of 20% by weight in ethanol was treated in the above described device. Hereby aluminium oxide was used as separation phase in a layer thickness of 8 cm, whereby the conveyor belt having a breadth of 1 m was transported with a speed of 10 m/h through the chambers 2 to 4.

In the first chamber 2 2250 kg of the solution of the mixture A of 20% by weight in ethanol/h were sprayed by nozzles onto the separation phase and continuously drawn off.

In the second chamber 3 1000 kg of ethanol/h were flushed onto the separation phase charged with the mixture C.

The eluate hereby emerged and drawn off over the outlets 8 and 9 contained a mixture D, whereby the composition of the mixtures C and D is indicated below.

Composition of the mixture C (before the treatment):
77–86% by weight phosphatidylcholine,
0–4% by weight phosphatidylethanolamine,
0–4% by weight phosphatidylinositol,
3–6% by weight phosphatidic acid,
1–5% by weight soy oil and
0–19% by weight other accompanying substances.
Composition of the mixture D (after the treatment):
90–96% by weight phosphatidylcholine,
0% by weight phosphatidylethanolamine,
0% by weight phosphatidylinositol,
0% by weight phosphatidic acid,
1–3% by weight soy oil and
0–7% by weight other accompanying substances.

The comparison of the above indicated compositions of the mixtures C and D shows clearly that the accompanying phospholipides as phosphatidylethanolamine, phosphatidylinositol and phosphatidic acid were removed during the treatment.

Furthermore the concentration of other accompanying substances was essentially reduced.

After the elution of the separation phase this separation phase moistened with ethanol was heated up to a temperature of 80° C. in the drying chamber 4 under a vacuum. That led to the fact that the ethanol was completely vaporized out of the separation phase and that a dry separation phase emerged which was correspondingly wasted.

EXAMPLE 3

A solution of the mixture E of 8% by weight in ethanol was treated in the above described device. Hereby aluminium oxide was used as separation phase in a layer thickness of 8 cm, whereby the conveyor belt having a breadth of 1 m was transported with a speed of 10 m/h through the chambers 2 to 4.

In the first chamber 2 3600 kg of the solution of the mixture E of 8% by weight in ethanol/h were sprayed by nozzles onto the separation phase.

In the second chamber 3 1000 kg of ethanol/h were flushed onto the separation phase charged with the mixture E.

The eluate hereby emerged and drawn off over the outlet 9 contained a mixture F, whereby the composition of the mixtures E and F is indicated below.

Composition of the mixture E (before the treatment):
45–55% by weight phosphatidylcholine,
12–20% by weight phosphatidylethanolamine,
0–8% by weight phosphatidylinositol,
2–8% by weight phosphatidic acid,
1–5by weight soy oil and
0–5% by weight other accompanying substances.
Composition of the mixture F (after the treatment):
70–80% by weight phosphatidylcholine,
0–12% by weight phosphatidylethanolamine,
0–6% by weight phosphatidylinositol,
0–1% by weight phosphatidic acid,
1–3% by weight soy oil and
0–8% by weight other accompanying substances.

The comparison of the above indicated compositions of the mixtures E and F clearly shows that the concentration of phosphatidylcholine was essentially increased during the treatment.

After the elution of the separation phase this separation phase moistened with ethanol was heated up to a temperature of 80° C. in the drying chamber 4 under a vacuum. That led to the fact that the ethanol was completely vaporized out of the separation phase and that a dry separation phase emerged which was correspondingly wasted.

EXAMPLE 4

A solution of the mixture G of 50% by weight in ethanol was treated on the above described device. Hereby silicon dioxide was used as separation phase in a layer thickness of 12.5 cm, whereby the conveyor belt having a breadth of 1 m was transported with a speed of 10 m/h through the chambers 2 to 4.

In the first chamber 2 3000 kg of the solution of the mixture G of 30% by weight in ethanol/h were sprayed by nozzles onto the separation phase.

In the second chamber 3 2000 kg of ethanol/h were sprayed by nozzles onto the separation phase charged with the mixture G.

In the third chamber 4 the separation phase charged with the mixture was eluted with 7000 kg of ethanol.

The eluate hereby emerged and drawn off over the outlet 10 contained a mixture H, whereby the composition of the mixtures G and H are indicated below.

Composition of the mixture G (before the treatment):
16–36% by weight phosphatidylcholine,
0–20% by weight phosphatidylethanolamine,
0–8% by weight phosphatidylinositol,
3–10% by weight phosphatidic acid,
25–40% by weight soy oil and
0–6% by weight other accompanying substances.
Composition of the mixture H (after the treatment):
77–86% by weight phosphatidylcholine,
0–4% by weight phosphatidylethanolamine,
0–4% by weight phosphatidylinositol,
3–6% by weight phosphatidic acid,
1–5% by weight soy oil and
0–19% by weight other accompanying substances.

The comparison of the above indicated compositions of the mixtures G and H clearly shows that the concentration of the phosphatidylcholine was essentially increased during the treatment.

After the elution of the separation phase this separation phase moistened with ethanol was heated up to a temperature of 80° C. in the drying chamber 4 under a vacuum. That led to the fact that the ethanol was completely vaporized out of the separation phase and that a dry separation phase emerged which was correspondingly wasted. The separation phase can be used again when it is moistened with ethanol.

EXAMPLE 5

A solution of a dried extract of 70% by weight obtained by the extraction of yew needles with methanol was manufactured in butyl acetate and treated in the above described device. Hereby silica gel (Compalox) was used as separation phase in a layer thickness of 10 cm on the conveyor belt, whereby the conveyor belt having a breadth of 1 m was transported with a speed of 5 m/h through the chambers 2 to 4.

In the first chamber 2 100 kg of the above described solution of 70% by weight in butyl acetate/h was sprayed by nozzles onto the separation phase.

In the second chamber 3 300 kg of the ethanol/h was sprayed by nozzles onto the separation phase charged with the mixture.

The eluate hereby emerged and drawn off over the outlet 9 was wasted.

In the third chamber 4 the separation phase charged with the mixture was eluted with a solvent mixture (methanol:acetone:acetic ester; V:V:V; 70%:15%:15%) at a temperature of 30° C.±5° C., whereby this solvent mixture had a flow rate of 500 kg/h.

The eluate hereby emerged and drawn out of the chamber 4 over the outlet 10 mainly consisted of 10-deacetylbaccatin III (10-DAB) next to the above indicated solvent mixture, whereby the 10-deacetylbaccatin III (10-DAB) had a degree of purity of 97% by weight.

According to embodiment 5 the initial solution of the extract of 70% by weight that was applied in the first chamber and that is meant to be separated had a maximum of between 4% by weight and 5% by weight of 10-deacetylbaccatin III (10-DAB).

We claim:

1. A method for separating a mixture containing at least two components by means of a solid separation phase arranged on a conveyor belt, comprising at a first station, continuously charging said separation phase with said mixture to be separated, continuously transporting said separation phase and said mixture to a second station, and at said second station, continuously eluting said separation phase with at least one elution fluid, wherein said separation phase is a single layer of a separation material, wherein said separation phase arranged on said conveyor belt has a thickness of between 0.1 cm and 30 cm, and wherein said mixture to be separated comprises an extract of a natural product.

2. The method of claim 1 wherein the thickness of said separation phase is between 2 cm and 15 cm.

3. The method of claim 1 wherein said mixture to be separated is in the form of a solution, an emulsion, or a dispersion.

4. The method of claim 3 wherein said solution, emulsion, or dispersion is sprayed onto said separation phase at said first station.

5. The method of claim 1 further comprising drying said separation phase charged with said mixture between said first station and said second station.

6. The method of claim 1 wherein said separation phase is continuously transported to additional stations subsequent to said second station, said additional stations including at least one station wherein said separation phase is eluted with at least one additional elution fluid.

7. The method of claim 1 further comprising causing an inert gas to flow around said separation phase as it is transported by said conveyor belt.

8. The method of claim 1 further comprising regenerating said separation phase after it has been eluted.

9. The method of claim 1 further comprising drying said separation phase after it has been eluted.

10. The method of claim 1 wherein said separation phase comprises silica gel, infusorial earth, aluminum oxide, or combinations thereof.

11. The method of claim 1 wherein said step of continuously charging said separation phase with said mixture to be separated is carried out under a vacuum.

12. The method of claim 1 wherein said step of continuously eluting said separation phase is carried out under a vacuum.

13. The method of claim 1 wherein said mixture to be separated comprises an extract of a plant.

14. The method of claim 1 wherein said mixture to be separated comprises an extract of a yew plant.

15. The method of claim 14 wherein said separation phase comprises silica gel, and said at least one elution fluid comprises an alcohol or an alcohol mixture.

16. The method of claim 15 wherein said alcohol or alcohol mixture comprises a $C_1$–$C_4$ alcohol or alcohol mixture.

17. The method of claim 1 wherein said mixture to be separated comprises an extract of yew needles.

18. The method of claim 17 wherein said mixture to be separated further comprises butyl acetate as a solvent.

19. The method of claim 17 wherein said mixture to be separated further contains between 3% and 20% by weight of 10-deacetylbaccatin III (10-DAB).

20. The method of claim 1 wherein said mixture to be separated comprises an extract crude or substantially pure lecithin.

21. The method of claim 20 wherein said lecithin comprises soybean lecithin.

22. The method of claim 20 wherein said separation phase comprises aluminum oxide, said at least one elution fluid comprises an alcohol or an alcohol mixture.

23. The method of claim 22 wherein said alcohol or alcohol mixture comprises a $C_1$–$C_4$ alcohol or alcohol mixture.

24. The method of claim 1 wherein said elution step is carried out at a temperature of between 10° C. and 60° C.

* * * * *